United States Patent
Doman et al.

(10) Patent No.: US 6,266,843 B1
(45) Date of Patent: Jul. 31, 2001

(54) VEHICLE WINDOW WIPER ASSEMBLY HAVING ONE-PIECE CARRIER WITH FLEXIBLE TIPS

(75) Inventors: Bradley Napier Doman, Ann Arbor; Dennis Michael Sopko, Dearborn Heights; Jerome Tzau, Livonia, all of MI (US)

(73) Assignee: Ford Global Technologies,Inc., Dearborn, MI (US)

( * ) Notice: Subject to any disclaimer, the term of this patent is extended or adjusted under 35 U.S.C. 154(b) by 0 days.

(21) Appl. No.: 09/303,751

(22) Filed: May 3, 1999

(51) Int. Cl.[7] ................ B60S 1/40; B60S 1/38
(52) U.S. Cl. ................ 15/250.201; 15/250.43; 15/250.32
(58) Field of Search .......... 15/250.43, 250.361, 15/250.201, 250.32, 250.44, 250.451, 250.452, 250.48

(56) References Cited

U.S. PATENT DOCUMENTS

| | | | |
|---|---|---|---|
| 2,543,383 | 12/1951 | Scinta et al. | 15/250.43 |
| 3,089,175 | 5/1963 | Hinder | 15/250.43 |
| 3,104,412 | 9/1963 | Hinder | 15/250.43 |
| 3,192,551 | 7/1965 | Appel | 15/250.43 |
| 3,480,986 | 12/1969 | Forster | 15/250.43 |
| 3,780,395 | 12/1973 | Quinlan et al. | 15/250.43 |
| 3,872,537 | 3/1975 | Bianchi | 15/250.44 |
| 3,881,213 | 5/1975 | Tilli | 15/250.44 |
| 3,995,347 | * 12/1976 | Kohler | 15/250.43 |
| 4,014,061 | * 3/1977 | Jurowski et al. | 15/250.43 |
| 4,028,770 | 6/1977 | Appel | 15/250.43 |
| 4,057,869 | * 11/1977 | Longman et al. | 15/250.32 |
| 4,976,001 | 12/1990 | Wright | 15/250.43 |
| 5,392,489 | 2/1995 | Mohnach . | |
| 5,485,650 | 1/1996 | Swanepoel | 15/250.43 |
| 5,487,205 | 1/1996 | Scherch et al. | 15/250.452 |
| 5,522,113 | 6/1996 | White | 15/250.361 |
| 5,572,764 | 11/1996 | Fernandes et al. | 15/250.361 |
| 5,797,160 | 8/1998 | Jeffer et al. | 15/250.361 |

FOREIGN PATENT DOCUMENTS

| | | |
|---|---|---|
| 466048 | 1/1948 | (CA) . |
| 2319148 | 10/1973 | (DE) . |
| 28 43 164 | 4/1979 | (DE) . |
| 0 279 640 | 2/1988 | (EP) . |
| 619321 | 3/1949 | (GB) . |
| 1212131 | 11/1970 | (GB) . |
| 1 447 724 A | 3/1973 | (GB) . |
| 1395918 | 5/1975 | (GB) . |
| 1438568 | 6/1976 | (GB) . |
| 52-5123 | 7/1975 | (JP) . |

\* cited by examiner

Primary Examiner—Gary K. Graham
(74) Attorney, Agent, or Firm—David B. Kelley

(57) ABSTRACT

A vehicle window wiper assembly has a one-piece carrier with a central section and flexible tips to allow the wiper to accommodate windows of high curvature. The tips have a higher flexibility than the central section, due in part to molded serrations on the bottom surface in combination with decreased thickness and width with respect to the central section. The central section and the tips also have different radii of curvature which provide a uniform pressure distribution across the window during wiping operation, even at high curvature window locations. A blade channel extends the longitudinal length of the carrier for receiving a wiper blade therein. The central section has a molded air foil defined by a downwardly projecting, longitudinally extending lip on a leading edge for preventing wiper assembly lift. The rear edge of the central section may have similar lip. A pair of laterally opposed attachment flanges, as well as laterally opposed stability posts, are integrally molded with the central section, as are the tips and air foil lips. The carrier is integrally molded with the aforementioned features, preferably of a thermoplastic material, with no moving parts, and thus is not susceptible to the adverse effects of snow and ice induced lock-up.

11 Claims, 7 Drawing Sheets

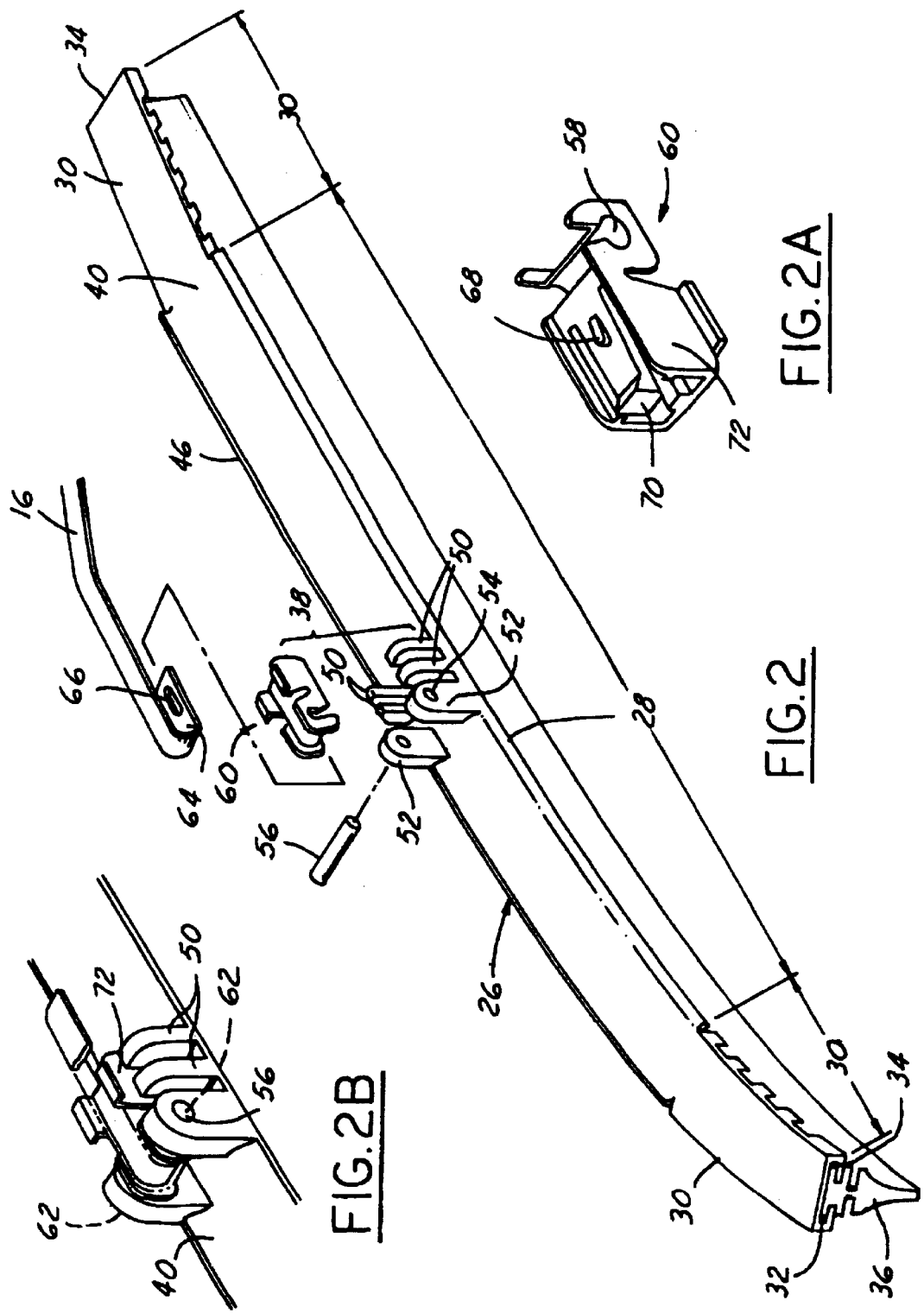

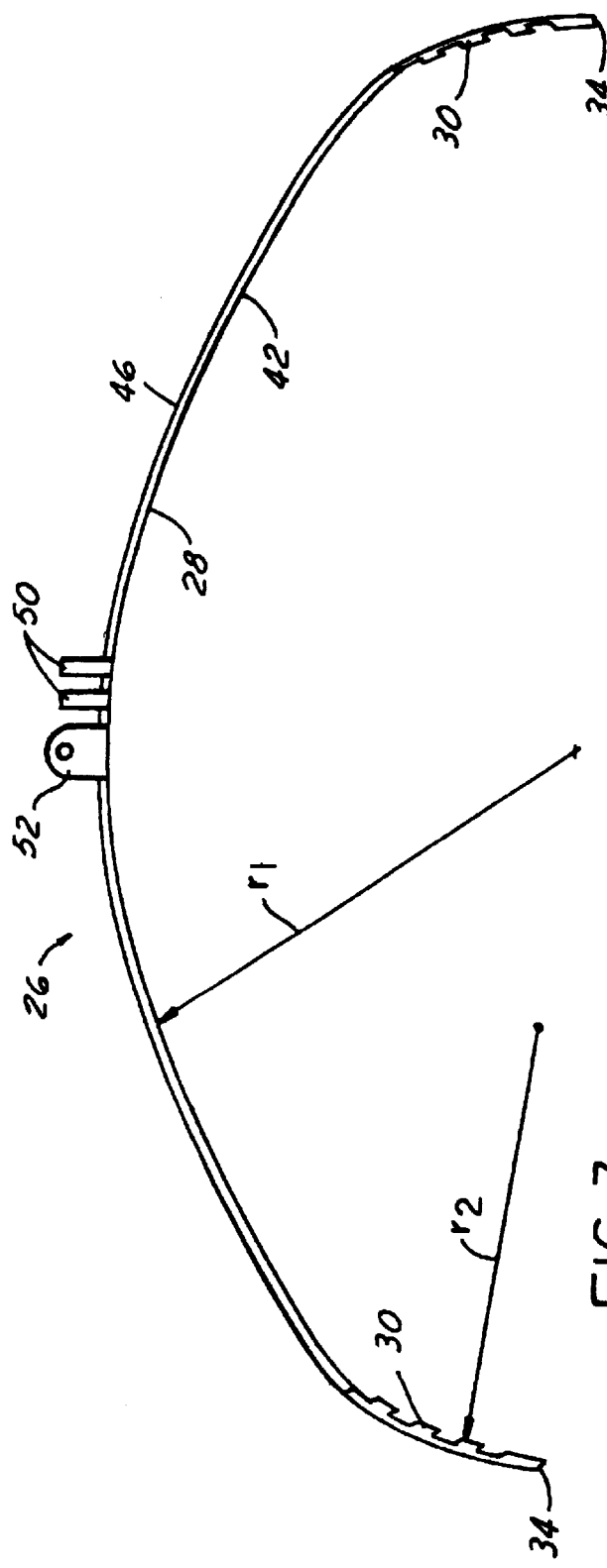
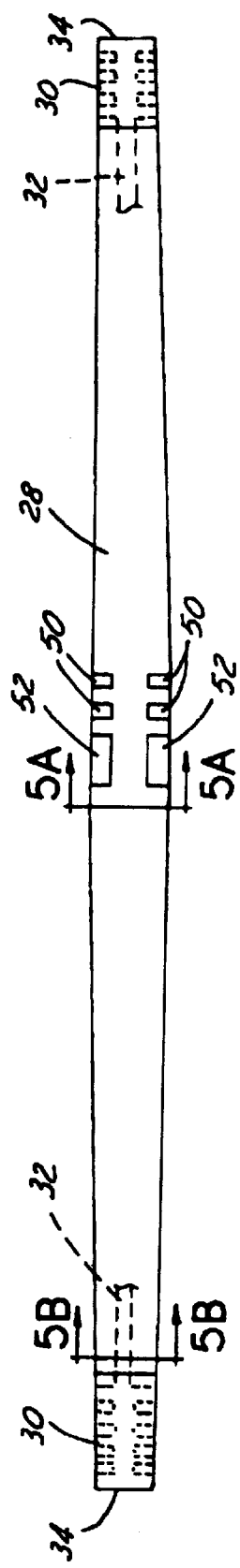

VEHICLE WINDOW WIPER ASSEMBLY HAVING ONE-PIECE CARRIER WITH FLEXIBLE TIPS

FIELD OF THE INVENTION

The present invention relates to vehicle window wipers in general, and more specifically to wiper assemblies with a single piece blade carrier.

BACKGROUND OF THE INVENTION

Windshield wiper systems used on most automotive vehicles have a whiffle-tree wiper superstructure for carrying the wiper blade. Such a system has many metal linkages, a single or double vertebrae, and many riveted joints with tight clearances. A typical system also includes claws for attachment of a rubber wiping blade. While such a structure works well in many circumstances, there are various drawbacks which make an improved wiper assembly desirable. One drawback is that moisture may seep into the riveted joints and freeze in colder temperatures preventing the wiper from flexing and thus causing it to separate from the windshield. Another potential drawback of the whiffle-tree wiper system is a large pressure variation along the length of the wiper blade causing smearing and streaking during wiping operations. This pressure variation is typically caused when the claws are spaced too far apart so that a high pressure area develops under each claw and low pressure areas develop between claws. This non-uniformity in wiper pressure may cause localize wiper blade element deformation which, over the course of time, may lead to a permanent set in the wiper element. Such a permanent set would invariably require wiper element replacement.

Another disadvantage of conventional wiping systems is an inability to uniformly wipe high curved portions of the windshield which are typically at the laterally outermost edges thereof. The wiper may not be in contact with the windshield at the outer extremes, thus allowing snow, ice and other debris to build up.

As a further complication, windshield curvature varies, in some cases substantially, across vehicle models thus requiring specialized wiper system designs for each vehicle model. One attempt for providing a wiper system to address some of the aforementioned problems is shown in U.S. Pat. No. 4,976,001 (Wright). The design in Wright forms a carrier by two similar parts, each being the mirror image of the other part to form a longitudinal recess for the wiper blade as well as a spline. Transverse grooves in the spline form confronting and abutting surfaces that promote flexibility of the spline. The disclosed design in Wright requires several parts to be assembled and, disadvantageously, has the transverse grooves along nearly the entire length of the wiper system, including the center of the windshield where a uniform wipe is important. Further, the Wright system is susceptible to precipitation freezing between the transverse grooves in the center area leading to non-uniform wiping.

There is thus needed a windshield wiping system which provides flexibility to accommodate high curvature portions of a windshield, which provides a uniform wipe pressure distribution over the central portion of the windshield, which has few parts to be assembled and which is not susceptible to wipe degradation under frozen precipitation conditions.

SUMMARY OF THE INVENTION

To meet the desired characteristics and to overcome the disadvantages of the related art, the present invention provides a wiper assembly for a vehicle window comprising a one-piece carrier, a wiper blade mountable to the carrier, and attachment means for attaching the carrier to a wiper arm. The one-piece carrier has a central section with a substantially smooth upper surface, a bottom surface, and a pair of laterally opposed, continuous sides providing a first flexibility. A pair of tips extends from opposed ends of the central section, each of the pair of tips having serrated edges providing a second flexibility greater than the first flexibility. In one embodiment, the serrated edges are formed by a plurality of laterally extending notches. A longitudinal blade channel extends between opposed ends of the carrier with a blade opening in the bottom surface in communication with the blade channel receiving the wiper blade therein. The central section has a downturned lip integral therewith along a leading edge thereof, and an upturned lip integral therewith along a trailing edge thereof, the downturned and upturned lips cooperating to aerodynamically route air over the assembly so as to provide a downward force on the assembly to maintain contact with the vehicle. In another embodiment, the trailing edge has a downturned lip instead of an upturned lip.

BRIEF DESCRIPTION OF THE DRAWINGS

These and other objects, advantages, and features of the present invention will be apparent to those skilled in the art upon reading the following description with reference to the accompanying drawings, in which:

FIG. 2 is an exploded perspective view of one embodiment of the wiper system of the present invention;

FIG. 2A is a perspective view of an attachment device for use with the present invention;

FIG. 2B is a perspective view of an attachment means integral with the carrier section of the wiper system of the present invention for attachment to a wiper arm;

FIG. 3 is a side view of a wiper system according to one embodiment of the present invention;

FIG. 4 is a top view of the wiper system of FIG. 3;

DETAILED DESCRIPTION OF THE PREFERRED EMBODIMENT

Figure 1:
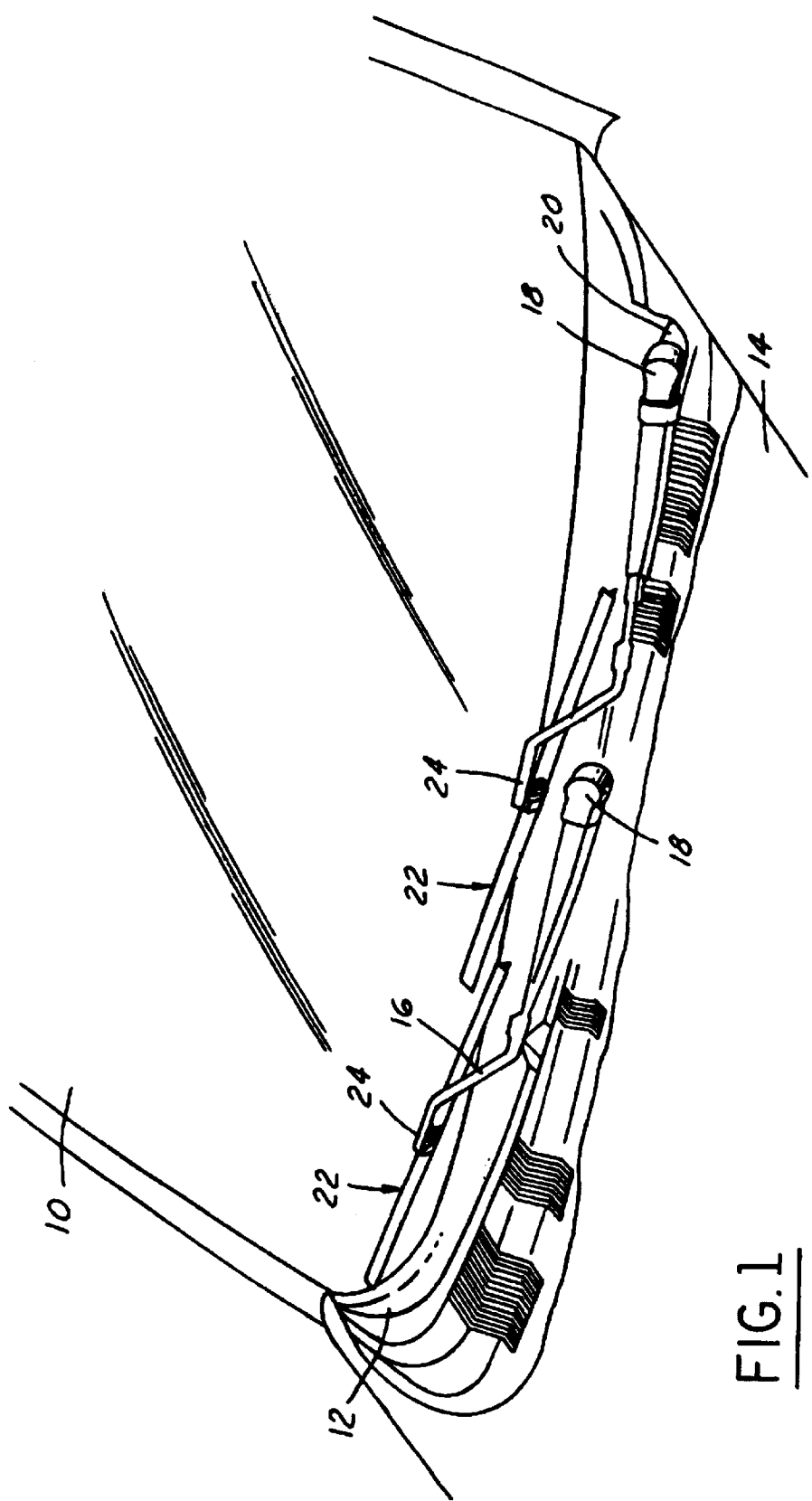
FIG. 1 is a perspective view of an automotive vehicle windshield showing a wiper system according to the present invention.

Turning now to the drawings, and in particular to FIG. 1 thereof, a vehicle windshield 10 is shown attached along a lower edge to a cowl section 12 which extends laterally across a width of the vehicle longitudinally rearward of a hood 14. A pair of wiper arms 16 are attached on one end 18 to a wiper pivot 20 (only one shown) and have a wiper assembly 22, more fully described below, attached on a second end 24. Those skilled in the art will understand that a typical wiper system includes a motor, a driveshaft, and various linkages for reciprocating the wiper spindles so that the wiper arms, and consequently the wiper assembly attached thereto, perform the windshield wiping function. It should also be understood that while the present invention is described in terms of a windshield, the wiper assembly may be used for wiping any desired window on a vehicle.

As seen in FIGS. 2 and 3, the wiper assembly 22 of the present invention has a one piece carrier 26 with a central section 28, a pair of tips 30 extending from opposed ends of central section 28, a longitudinal blade channel 32 extending through the carrier 26 between opposed ends 34, a wiper blade 36 mountable within the blade channel 32, and attachment means 38 (FIG. 2A) on the central section 28 for attaching the carrier 26 to a wiper arm 16.

Still referring to FIGS. 2–4, the central section 28 of the carrier 26 has a substantially smooth upper surface 40, a substantially smooth bottom surface 42, a forward edge having a continuously extending, downturned air foil portion 44, and a rear edge having a continuously extending, upturned air foil portion 46. The air foil portions 44, 46, best seen in FIGS. 5A and 5B, aerodynamically route air over the wiper assembly 22 and provide a downward force on the assembly so that it advantageously maintains contact with the vehicle. Alternatively, the central section 28 may have symmetrical downturned lips 47 along both front and rear edges 49, 51, respectively (FIG. 6A). Such a construction reduces carrier 26 bowing which may be caused by the upturned and downturned air foils of the embodiments in FIGS. 5A, 5B. Another design alternative which has been found to be effective is the rectangular shaped cross-section for the carrier 26 as seen in FIG. 6B.

Figure 7A:
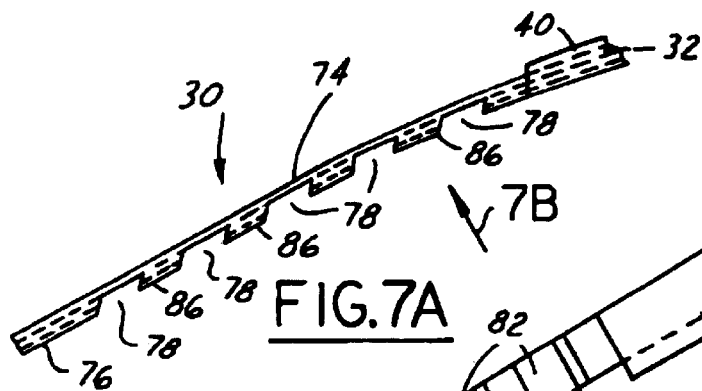
FIGS. 7A, 7B, 7C and 7D show side, top, and perspective views, respectively, of a preferred tip end of a wiper system according to the present invention.
Figure 7B:
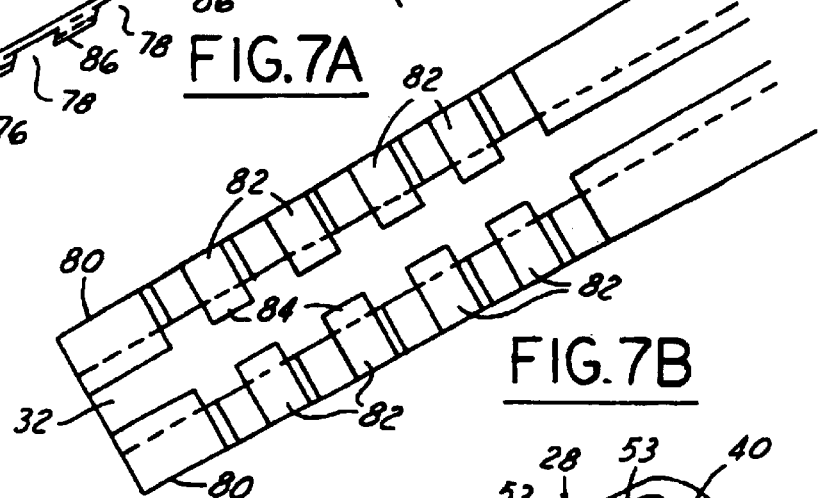
Figure 7C:
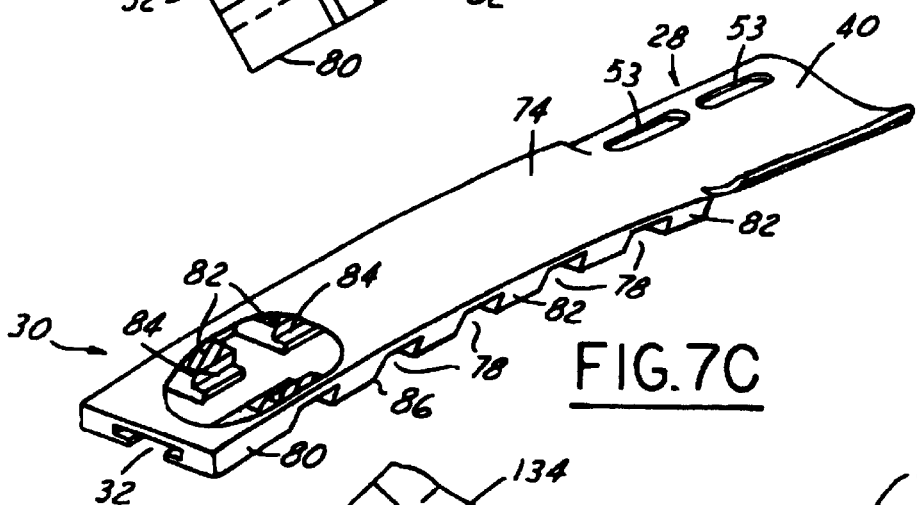

To further decrease the likelihood of lift, the carrier 26 may have a series of pressure relieving slots 53 incorporated therethrough (FIG. 7C).

The central section 28 of the one-piece carrier 26 preferably has a first predetermined width and thickness at a middle position shown in FIG. 5, the central section 28 narrowing in width and thickness (FIG. 6) with longitudinal distance from the middle position to the pair of tips 30. The central section 28 thus has a first flexibility at the middle position which remains essentially constant therealong due to a combination of factors, including the narrowing in thickness and width, as well as the curvature of the central section 28 with distance from the middle position (FIG. 3).

Figure 5A:
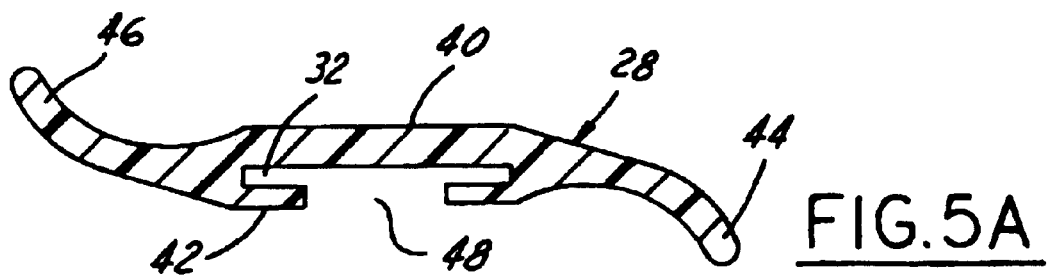
FIGS. 5A and 5B are cross-sectional views taken along line 5A—5A and line 5B—5B of FIG. 4, respectively.
Figure 5B:
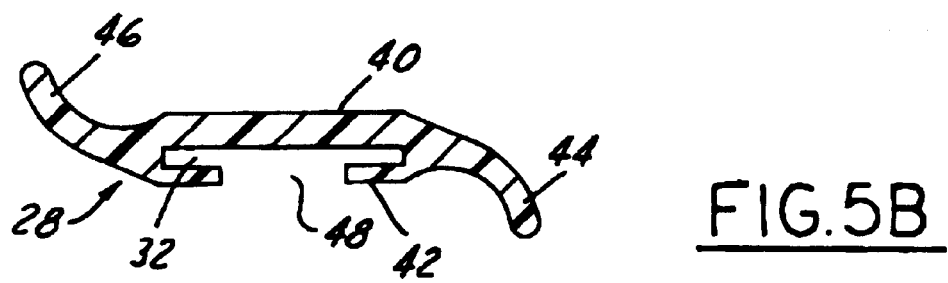
Figure 6A:
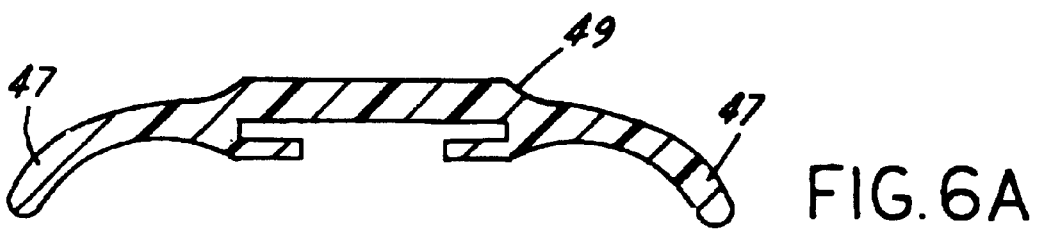
FIGS. 6A and 6B are alternative cross-sectional shapes for a central section of the wiper system according to the present invention.
Figure 6B:

In the bottom surface 42, is provided an opening 48 in communication with the blade channel 32 to allow placement of a wiper blade therein (FIGS. 5A, 5B).

Since lateral rigidity of the wiper is important during wiper system movement, posts 50 are preferably discontinuously spaced so as to extend perpendicularly to the upper surface 40 and adjacent to a pair of laterally opposed wiper arm attachment flanges 52 (FIGS. 2–4). The attachment flanges 52 have holes 54 therein for receiving a pin 56, the pin 56 attaches through a channel 58 of an attachment clip 60 so as to attach the clip 60 to the carrier 26. The clip 60 is thus rotatably mounted along a rotation axis 62 (FIG. 2B) perpendicular to a longitudinal axis of the carrier. The clip 60 is adapted for attachment to a hook portion 64 of the wiper arm 16 (FIG. 2). The hook portion 64 mates with the clip 60 by engagement of hook hole 66 with locking tab 68 on flexible detente member 70 (FIGS. 2 and 2A). In an assembled configuration as seen in FIG. 2B, the clip 60 has side members 72 which abut the posts 50 to provide the aforementioned lateral stability.

Figure 7D:
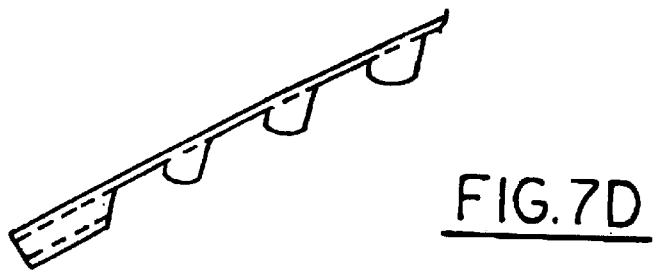

Turning now to FIGS. 7A–7C, a preferred design for tip 30 of the present invention is shown. The tip 30 has a smooth tip upper surface 74 substantially continuous with the upper surface 40 of the central section 28. A tip bottom surface 76 has laterally extending notches 78 defining a pair of serrated opposed side walls 80. The notches 78 are in communication with the blade channel 32 and form teeth 82 which preferably have shoulders 84 for supporting a mating flange of the wiper blade 36. The tips 30 thus provide a second flexibility greater than the first flexibility of the central section 28. Preferably, the notches 78 are parallelogram in shape and are positioned with a leading corner 86 coincident with the tip bottom surface 76 (FIG. 7A). Other notch 78 shapes are also acceptable, for example rectangular, square trapezoidal, circular, oblong, elliptical and other curved shapes (not shown). Such shapes may formed in combination with like shaped teeth 82, or may have differently shaped teeth, for example having rounded ends (FIG. 7D).

It is believed that the foregoing wiper carrier construction provides a desirable tip flexibility particularly to accommodate windshield curvature variations, such as those found in the lateral portions of the windshield. The cross-sectional properties and the radius of curvature of the tip 30 are different than the central section 28, thus allowing the wiper assembly 26 to maintain more uniform pressure load across different windshield shapes. In addition, even though a particular windshield curvature may change between the in-wipe and out-wipe position of a wiper assembly, the contour of the central section 28, in combination with the tip 30 design together produce a more uniform pressure distribution and thus a better wipe quality than conventional wiper systems. The combination of lower stiffness and higher curvature of the tips provides a continuous flexibility transition between the central section 28 and the tips 30.

As seen in FIG. 3, the central section 28 has a radius of curvature $r_1$, whereas the tips 30 have a second smaller radius of curvature $r_2$. It is believed that this smaller radius $r_2$, or overbend, advantageously provides more uniform wipe distribution at the ends of the wiper assembly 26. In addition, narrowing of the central section 28 in the longitudinal direction towards the ends from the middle position further assists in providing a uniform pressure distribution. The combination of varying curvatures and longitudinal flexibility afforded by the described structure of the present invention produces a continuous pressure against the windshield when a predetermined arm force is applied at the wiper attachment point of the wiper system.

Preferably, the wiper carrier 26 is made of a molded thermoplastic material, but can be made of metal or a combination of plastic and metal. Since the shape of the wiper carrier 26 is important to attain uniform pressure distribution, a material should be selected which can withstand extreme environmental conditions without affecting the ability to deliver a constant pressure distribution over the life of the wiper system. One such material is polyetherimide. In a preferred embodiment, the central section 28, the tips 30, the attachment flanges 52, and the posts 50 of the one-piece carrier 26 are an integral piece with each of the features molded as one.

The just-described design has no sliding interfaces and no individual claw attachment points for the rubber blade element, and thus will not freeze in cold conditions, and will continue to function despite ice, snow and other debris collecting on the windshield. In addition, since there are no levers and claw attachments, the wiper assembly profile is very low in comparison with conventional designs, improving both vehicle appearance, driver down vision and performance in high speed conditions.

Figure 8A:
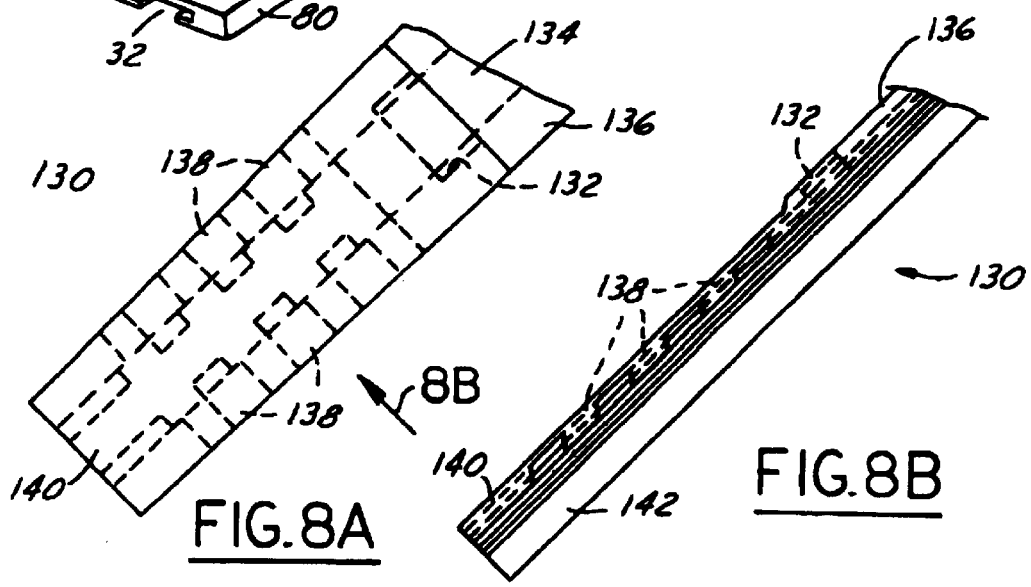
FIGS. 8A, 8B, 9A, 9B, and 10A, 10B show top and side views of three alternate tip end designs respectively, for the wiper system of the present invention.
Figure 8B:
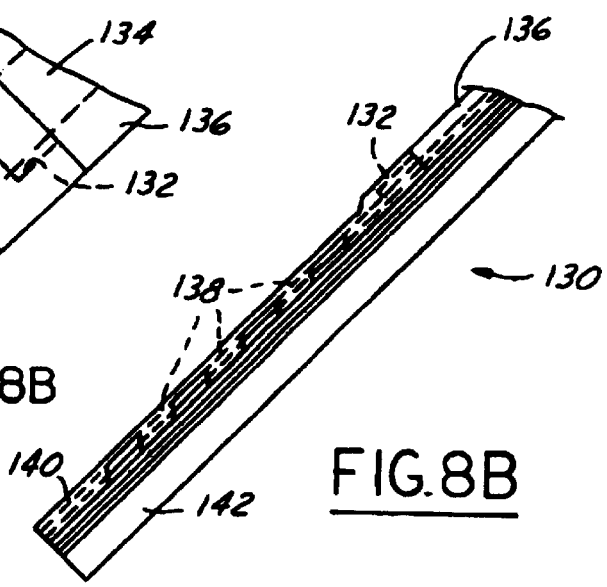

Alternative tip designs for the wiper assembly of the present invention are shown in FIGS. 8A–B, 9A–B and 10A–B. In FIG. 8A–B, a tip 130, preferably made of a thermoplastic material, has a groove 132 for receiving a tongue 134 of a carrier portion 136 in overlapping relationship. The tip 130 has spaced teeth 138 of similar design as that described in FIGS. 7A–C for providing a second flexibility greater than the first flexibility of the carrier 136. A blade channel 140 extends through the tip 130 for receiving a blade 142 therein (FIG. 8B).

Figures 9A, 9B:
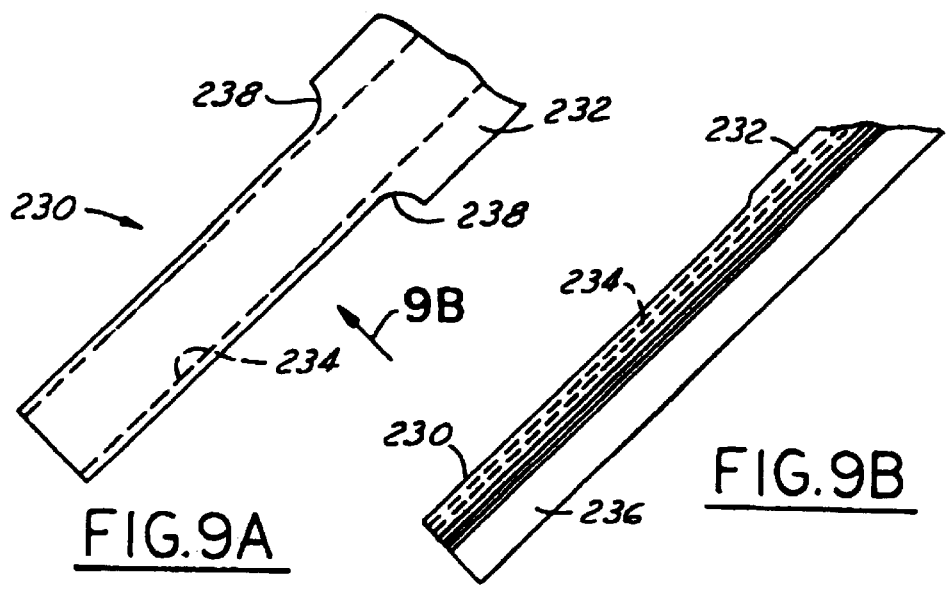

In a second alternative embodiment, an integral tip 230 extends from a carrier 232. The tip 230 is narrower (FIG. 9A) and thinner (FIG. 9B) than the carrier 232. A blade channel 234 extends through both the tip 230 and carrier 232 for receiving a wiper element 236 therein (FIG. 9B). Preferably, the tip 230 and carrier 232 are made of a metal material in a single, integrated piece, with the tip 230 narrowing from the carrier 232 at radiused sections 238 (FIG. 9A).

Figures 10A, 10B:
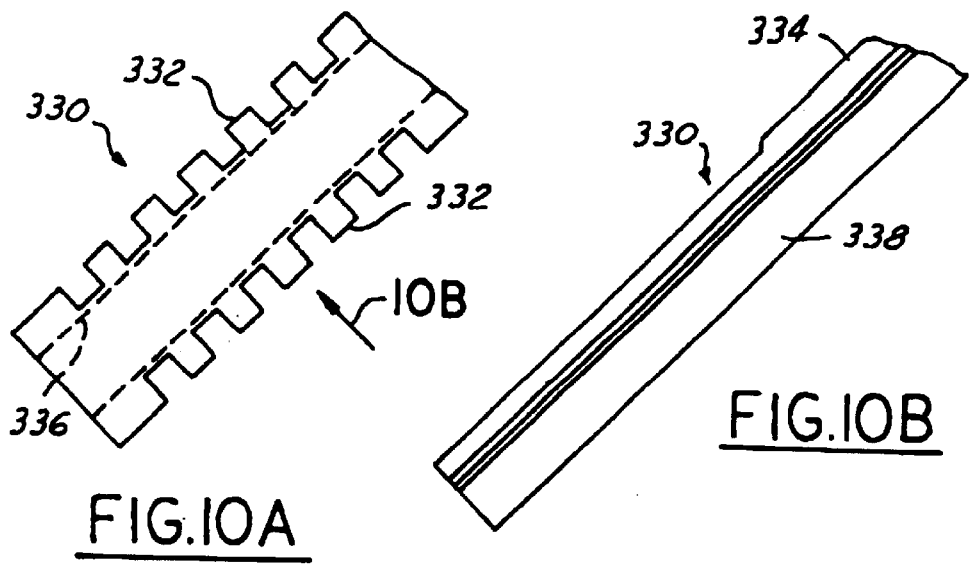

In FIGS. 10A–B, a third alternative tip 330 is shown with saw-toothed sides 332 and a thickness less than a carrier 334 from which it extends. A blade channel 336 extends to the tip 330 (FIG. 10A) for receiving a wiper element 338 therein (FIG. 10B). The tip 330 and carrier 334 are preferably made from a metal material, but as with the previous tip designs described above, may be made of a thermoplastic material or a combination of metal and plastic.

Figure 11A:
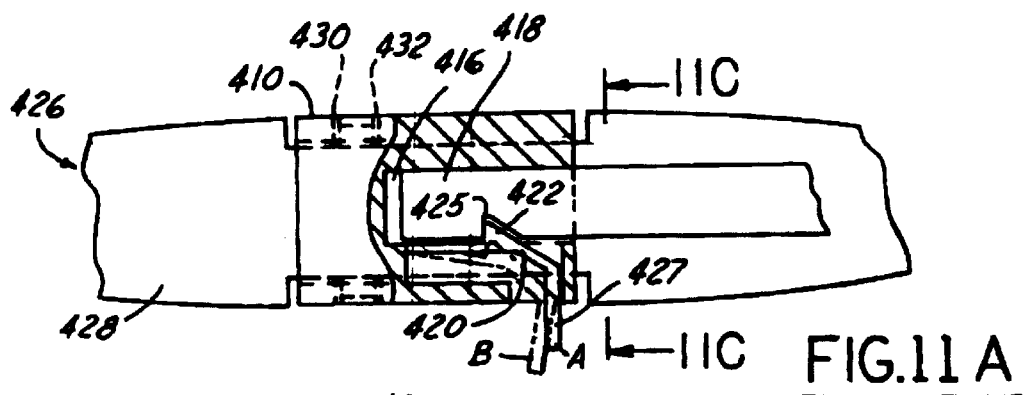
FIGS. 11A, 11B and 11C show top, side, and cross-sectional views of an alternative attachment means for attaching a wiper carrier of the present invention to a wiper arm.
Figure 11B:
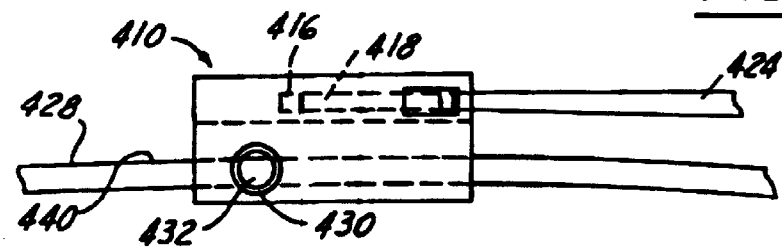
Figure 11C:
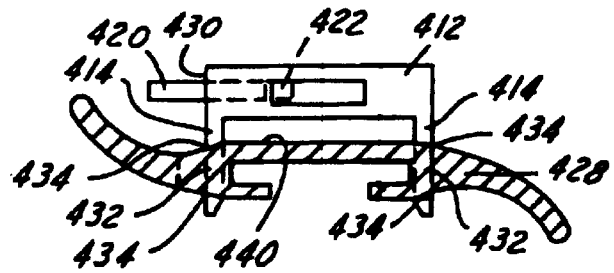

To further provide reduced wiper assembly profile, an attachment means according to the present invention, as seen in FIGS. 11A–11C, may be utilized for connecting a wiper arm to the wiper carrier. The attachment means comprises a clip housing 410 removably and rotatably attached to the central section 428 of the carrier 426. The clip housing 410 has an arm attachment section 412 above an upper surface 440 of the central section 428 laterally connecting a pair of longitudinally extending, opposed housing sides 414 (FIG. 11C). The clip housing also has a tip receiving channel 416 through the attachment section 412 for receiving a tip end 418 of a wiper arm 424 (FIGS. 11A–B). A clip member 20 is attached to one of the opposed sides 414 and has a clip head 422 extending into the tip receiving channel 416 (FIG. 11A). The clip head 422 is preferably triangular shaped within a notch 425 in the tip end 418. The clip member 420 also has an unlock tab 427 extending beyond an outer surface 430 of one of the opposed sides 414 for operation of the clip member between a locked position A (FIG. 11A) with the clip head 422 engaged with the tip end 418 of the wiper arm 424 and a release position B (FIG. 11A) with the clip head 422 disengaged from the notch 425 of the tip end 418.

To facilitate rotary movement of the carrier 426 with respect to the wiper arm 424, the clip housing 410 has openings 430 in each of the opposed sides 414. Each of the openings 430 slips over a trunion 432 extending from, and preferably integral with, the central section 428 (FIGS. 11A–C). The trunions 432 preferably have chamfered sides 434 to facilitate attachment of the clip housing 414 to the central section 428 and to facilitate rotation about the trunions (FIG. 11C).

Figure 12A:
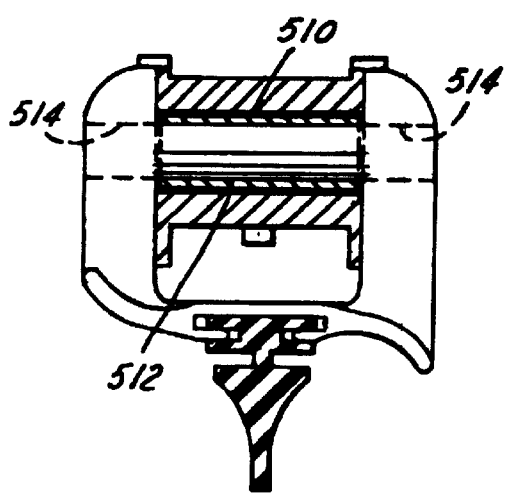
FIGS. 12A and 12B show alternative attachment mechanisms for attaching the integral wiper carrier of the present invention to standard wiper arm attachments with a bushing adapter and a channel adapter, respectively.
Figure 12B:
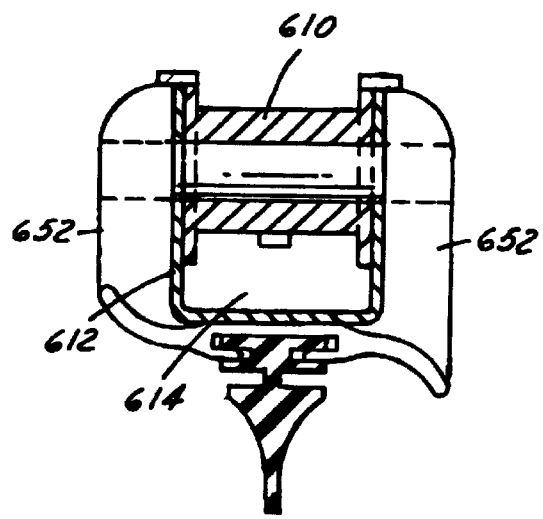

As seen in FIGS. 12A–B, the wiper assembly of the present invention may be configured to received wiper arm clip members from preexisting wiper assemblies. This retrofitting involves placing a bushing 512 within the clip bore 512 to axially align with the flange bores 514 so that an attachment pin (not shown) may properly fit therethrough.

A preexisting attachment clip 610 is too small to properly fit between attachment flanges 652. A U-shaped spacer 612 may be fit within the channel 614 formed between the attachment flanges 652 (FIG. 12B). A combination of the bushing 512 and the spacer 612 may be used if required to accommodate a clip with an oversized clip bore and a narrow width.

Although the preferred embodiment of the present invention has been disclosed, various changes and modifications may be made without departing from the scope of the invention as set forth in the appended claims.

What is claimed is:

1. A wiper assembly for a vehicle window, comprising:
    a one-piece carrier having a central section with a first predetermined width and a first predetermined thickness at a middle position thereof to provide a first flexibility;
    the carrier narrowing in width and thickness with longitudinal distance from the middle position to a pair of tips on opposed ends thereof;
    each of the pair of tips having serrated edges providing a second flexibility greater than the first flexibility;
    the central section of the carrier being substantially solid with unserrated edges and having a longitudinal blade channel extending between opposed ends of the carrier;
    a wiper blade mountable within the blade channel; and
    attachment means on the central section of the carrier adapted for attachment to a wiper arm.

2. The wiper assembly of claim 1 wherein the central section has a downturned lip along a forward edge thereof and an upturned lip along a rear edge thereof, the lips cooperating to aerodynamically route air over the assembly and to provide a downward force on the assembly to maintain contact with the vehicle.

3. The wiper assembly of claim 2 wherein the attachment means comprises an attachment member integral with the carrier and a clip rotatably mounted thereto along a rotation axis perpendicular to a longitudinal axis or the carrier, the clip adapted for attachment to a hook portion of the wiper arm.

4. The wiper assembly of claim 3 wherein the attachment member comprises a pair of opposed attachment flanges each having a hole therein aligned with the rotation axis for receiving a pin therethrough.

5. The wiper assembly of claim 4 wherein the central section has integral therewith at least two laterally opposed post members on the upper surface adapted for interaction with the wiper arm to provide lateral stiffness of the wiper assembly during window wiping operation.

6. The wiper assembly of claim 1 wherein the carrier is made of a thermoplastic material.

7. A wiper assembly for a vehicle window, comprising:
    a one-piece carrier having integral therewith:
        a central section with a substantially smooth central upper surface, a substantially smooth central bottom surface, the central section having a first flexibility and a first radius of curvature when in an unloaded state;
        a pair of tips extending from opposed ends of the central section, each of the pair of tips having a smooth tip upper surface substantially continuous with the central upper surface, and a tip bottom surface having a plurality of laterally extending notches defining a pair of serrated opposed side walls, the tips having a second flexibility greater than the first flexibility and a second radius of curvature smaller than the first radius of curvature when in an unloaded state, thus providing a continuous flexibility transition between the central section and the tips;

a longitudinal blade channel extending through the carrier between opposed ends thereof, the blade channel having a blade opening in the central bottom surface and the tip bottom surface in communication therewith;

a wiper blade mountable within the blade channel; and attachment means on the central section adapted for attaching the carrier to a wiper arm, wherein the attachment means comprises:

a clip housing removably and rotatably attached to the central section, the clip housing having an arm attachment section above the upper surface of the central section laterally connecting a pair of longitudinally extending, opposed housing sides, the clip housing also having a tip receiving channel in the attachment section adapted for receiving a tip end of a wiper arm therein; and a clip member in one of the opposed sides having a clip head extending into the tip receiving channel adapted for removable, mating attachment with the tip end of wiper arm, and an unlock tab extending beyond an outer surface of the one of the opposed sides for operation of the clip member between a locked position with the clip head engaged with the tip end of the wiper arm and a release position with the clip head disengaged from the tip end of the wiper arm.

8. The wiper assembly of claim 7 wherein the notches are parallelogram shaped.

9. The wiper assembly of claim 8 wherein the parallelogram shape of the notches are positioned so that a leading edge thereof are coincident with a bottom tip surface.

10. The wiper assembly of claim 7 wherein each of the tips has an overbend with respect to a curvature of the central section.

11. The wiper assembly of claim 7 wherein each of the opposed sides of the clip housing has an opening for rotatable mounting to a trunion on a side of the central section.

* * * * *